United States Patent Office 3,165,397
Patented Jan. 12, 1965

3,165,397
PREPARATION OF ALUMINUM PARTICLES
Paul A. Lobo, Ponca City, Okla., assignor to Continental Oil Company, Ponca City, Okla., a corporation of Delaware
No Drawing. Filed Mar. 26, 1962, Ser. No. 182,683
11 Claims. (Cl. 75—.5)

This invention relates to an improved method for the production of finely divided aluminum particles from the decomposition of organoaluminum compounds.

It is known that aluminum trialkyls and aluminum dialkyl hydrides will decompose thermally to produce metallic aluminum. When such a reaction is conducted within a flask or reactor without taking the precautions which are the subject of this invention, the aluminum will agglomerate as it is formed. As an agglomerate, the aluminum is useless as a component for solid rocket fuels. In that regard, the smaller the particle size of the aluminum the greater its usefulness, because in such a state the aluminum aids beneficially in controlling the burning rate of the fuel. Consequently, there is a need for a good method which can produce aluminum in submicron size.

Accordingly, the present invention is concerned with an effective method for producing aluminum in submicron size.

Another object is to provide a continuous method for producing aluminum of submicron particle size.

Other objects and advantages of the present invention will become apparent from the following description and explanation thereof.

In accordance with the present invention, an aluminum compound having the formula:

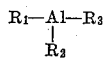

wherein the $R_1$, $R_2$ and $R_3$ groups are selected from alkyl radicals containing about 1 to 5 carbon atoms and hydrogen and at least two of the groups are alkyl radicals, is passed into a reaction zone, a carrier fluid is also passed into the reaction zone wherein the temperature is about 300° to 700° F., thereby causing the aluminum compound to decompose and form a thin aluminum film on the surface of the reaction zone, disrupting the aluminum film in the reaction zone to form finely divided aluminum particles and withdrawing the same from the reaction zone.

The aluminum compound which is decomposed in accordance with the present invention can be an aluminum trialkyl or an aluminum dialkyl hydride. Generically, the aluminum compound has the following formula:

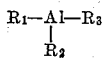

wherein the $R_1$, $R_2$ and $R_3$ groups are selected from alkyl radicals containing about 1 to 5 carbon atoms and hydrogen and at least two of the groups are alkyl radicals. Specific examples of the aluminum compounds are aluminum triethyl, aluminum diethyl hydride, aluminum tripropyl, aluminum dipropyl hydride, aluminum tributyl, aluminum dibutyl hydride, etc.

The aluminum compound may be passed alone into the reaction zone or it can be combined with a carrier fluid, diluent or solvent. In either case a carrier fluid is employed in the decomposition reaction. The carrier fluid serves the purpose of insuring uniform distribution of the aluminum compound in the reaction zone in a diluted state to avoid the deposition of thick films of aluminum on the surface of the reaction. The carrier fluid can be a liquid or a normally gaseous material, that is, inert under the conditions of reaction. Various types of carrier fluids can be employed, such as, for example, normally gaseous hydrocarbons, hydrogen, nitrogen, argon, etc. The liquid carrier material can be a paraffin or aromatic hydrocarbon or any other organic liquid which is inert under the conditions of reaction. Due to the wide abundance of petroleum, it is preferred that the carrier fluid be a petroleum product, such as, for example, gasoline, naphtha, kerosene, gas oil, etc. The petroleum product preferably has a boiling range, based on the ASTM method of about 200° to 400° F., IBP and an EP of about 400° to 700° F.

The carrier fluid can vary in amount relative to the aluminum compound. For the present purpose, the carrier fluid comprises about 5 to 99.9% of the mixture of aluminum compound and carrier fluid.

The conditions of reaction can be controlled to provide that the carrier material and aluminum compound are present in either the gaseous or liquid state. When it is desired to conduct the reaction in liquid phase, the pressure at which the decomposition reaction occurs is maintained at a level to insure at least substantial liquefaction of the carrier fluid. It is preferred that the aluminum compound be soluble in the carrier fluid when the operation is effected in the liquid phase; however dispersion or emulsification of the aluminum compound in the carrier fluid is also contemplated herein. In the gaseous state, the reactant and carrier material will readily combine together into a homogeneous mixture.

Submicron particles of aluminum can be produced in either a batch or continuous operation. For a batch operation, the flow of aluminum compound to the reactor is discontinued after a substantial amount or all of the reactor surface is coated with aluminum film; then, preferably, a liquid carrier is charged to the reactor to disrupt the aluminum film. The carrier fluid can be any of those which have been described hereinabove. The carrier fluid is flowed through the reactor at a superficial linear velocity of about 0.5 to 5 feet per second and at a temperature which is less than the reaction temperature to cause the film to shrink and fall off. When temperature difference is relied upon, the temperature of the carrier fluid is preferably about 20° to 250° F. less than the reaction temperature, still more preferably about 50° to 150° F. It is also contemplated that the mechanical action or turbulence of the carrier fluid flowing through the reactor can cause the aluminum film to disrupt from the reactor surface. The temperature at which the liquid carrier is passed through the reactor is about 175° to 700° F., more usually about 250° to 600° F.

In a continuous procedure, the disruption of aluminum film into submicron particles can be accomplished mechanically. The inside of the reactor may be equipped with a scraper blade which scrapes the walls of the reactor in a continuous manner and thereby breaks up the film into submicron sized particles. The particles are then carried out with the fluid which is discharged from the bottom of the reactor. In this connection, the aluminum compound is preferably charged to the reactor in an amount which will be decomposed entirely in order that the out-going mass is essentially only carrier fluid. However, it is also contemplated using an excess amount of aluminum compound even though it will then be present in the liquid product.

If desired, the by-product material of the reaction can be used as carrier fluid. Accordingly, the by-product may be recycled at a rate of about 0.10 to 25 volumes per volume of fresh aluminum compound which is charged to the reactor. The reaction is effected at various pressures, and the pressure selected depends upon whether or not a liquid or gaseous phase is desired. Generally, the pressure can be subatmospheric, atmospheric or superatmospheric. The exact pressure required is dependent on the temperature of operation, the lower the temperature, the lower the pressure required to obtain the desired decomposition of the alkyls or dialkyl hydrides. At any given set of conditions of temperature and pressure, the length of residence of the reaction mass within the reaction zone will govern the extent of decomposition of the aluminum compound. The residence time is usually between about 0.5 to 120 seconds, more usually about 1 to 10 seconds for the reaction mass.

The reactor to be used in the present invention is preferably one that provides a large surface area relative to its total volume. It is desirable that the area of the reactor provides the maximum surface area possible on which the aluminum is to be deposited. For such a purpose, the reactor is preferably long and of small cross-sectional area, because in that way a maximum surface area is preferably exposed to the aluminum compound. Accordingly, the reactor has an $L/D$ ratio, where L is the length and D is the internal diameter or equivalent thereof, ranging from about 2 to 10,000:1, preferably about 6 to 1,000:1.

To provide a fuller understanding of the present invention, reference will be had to the following specific examples.

*Example 1*

Aluminum trialkyls having alkyl radicals containing from 2 to 20 carbon atoms were diluted with kerosene having an A.S.T.M. initial boiling point of about 350° F. and an end point of 500° F. to yield a mass containing 80 percent by volume of aluminum trialkyl. The reaction mixture was passed into a reactor having a length of 27 feet and a diameter of ⅜ of an inch at a rate of 7.35 pounds per hour. The temperature of the tubular reactor was held at 525° F. The pressure of the reactor was 150 p.s.i.g. During the reaction, a mixture of ethylene, ethane and hydrogen was recycled to the reactor at a rate of approximately 150 parts by volume per unit volume of reaction mass. It was calculated that the flow rate of the recycled gas stream provided a gas residence time of 1.2 seconds. After 60 minutes, the flow of reaction mixture was discontinued, and kerosene having a boiling range of 350°–500° F. was pumped through the reactor. Submicron sized aluminum particles were yielded in the kerosene wash. The yield of aluminum particles was 19 percent based on the aluminum alkyl feed. The particle size of the aluminum was measured by means of an electron microscope and was found to be as follows.

| Size (microns): | Percent of total particles |
|---|---|
| 0.25 | 54 |
| 0.26–0.50 | 43 |
| 0.51–0.75 | 7 |
| 0.76–1.0 | 0.3 |

*Example 2*

20 volume percent of aluminum triethyl contained in the kerosene described in Example 1 was pumped continuously into a 6-inch diameter wiped film evaporator. The evaporator was maintained at a temperature of 340° F. and at a pressure of 25 microns. Then the feed mixture was fed to the evaporator at a rate of 1.85 pounds per hour. During the course of the reaction, an aluminum film was deposited on the side of the evaporator, and it was continuously removed by the wiping action of the blade. The undecomposed aluminum triethyl and the kerosene serve to wash the aluminum particles from the evaporator, and thus the entire mass was yielded as a bottom product of the evaporator. The evaporator had a length of 2 feet. The yield of aluminum particles was 90 percent based on the aluminum triethyl feed and the particle size ranged from about 0.25 to 1.5 microns.

Having thus described the invention by providing specific examples thereof, it is to be understood that no undue limitations or restrictions are to be drawn by reason thereof and that many variations and modifications are within the scope of the invention.

1. A method which comprises passing into a reaction zone an aluminum compound having the formula:

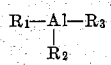

wherein the $R_1$, $R_2$ and $R_3$ groups are selected from hydrogen and alkyl radicals containing about 1 to 5 carbon atoms and at least two of the groups are alkyl radicals, passing an inert carrier fluid into the reaction zone, the temperature in the reaction zone being maintained at about 300° to 700° F., thereby causing the aluminum compound to decompose and form a thin aluminum film, disrupting the aluminum film in the presence of an inert carrier fluid in the reaction zone to form finely divided aluminum particles and withdrawing the aluminum particles from the reaction zone.

2. The method of claim 1 wherein the aluminum film is disrupted by the passage of a high boiling inert organic liquid having a temperature about 20° to 250° F. less than the reaction temperature through the reaction zone.

3. The method of claim 1 wherein the aluminum film is disrupted by scraping the surface in which the same is deposited.

4. The method of claim 1 wherein the inert carrier fluid is a normally gaseous hydrocarbon.

5. The method of claim 1 wherein the inert carrier fluid is a high boiling inert organic liquid.

6. A method which comprises passing into a reaction zone an aluminum compound having the formula:

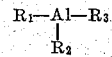

wherein the $R_1$, $R_2$ and $R_3$ groups are selected from hydrogen and alkyl radicals containing about 1 to 5 carbon atoms and at least two of the groups are alkyl radicals, passing an inert carrier fluid into the reaction zone, the temperature in the reaction zone being about 300° to 700° F., thereby causing a thin aluminum film to form on the surface of the reaction zone, discontinuing the flow of aluminum compound into the reaction zone, disrupting the aluminum film in the presence of an inert carrier fluid to form finely divided aluminum particles, and withdrawing the aluminum particles from the reaction zone.

7. The method of claim 6 wherein the aluminum film is disrupted by the passage of a high boiling hydrocarbon material having a temperature about 20° to 250° F. less than the reaction temperature.

8. A method which comprises passing continuously into a reaction zone an aluminum compound having the formula:

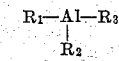

wherein the $R_1$, $R_2$ and $R_3$ groups are selected from hydrogen and alkyl radicals containing about 1 to 5 carbon atoms so that at least two groups are alkyl radicals, passing continuously a high boiling relatively inert organic liquid into the reaction zone, the temperature in the reaction zone is about 300° to 700° F., thereby causing the aluminum compound to decompose and form a thin aluminum film on the surface of the reaction zone, continuously disrupting the aluminum film in the presence of an inert carrier fluid to form finely divided aluminum particles, and withdrawing continuously aluminum particles from the reaction zone.

9. The method of claim 8 wherein the high boiling organic liquid is a kerosene.

10. The method of claim 8 wherein the aluminum film is disrupted by the wiping action of a blade along the surface of the reaction zone.

11. The method of claim 1 wherein the finely divided aluminum particles are submicron in size.

References Cited in the file of this patent

UNITED STATES PATENTS

| | | |
|---|---|---|
| 2,162,938 | Comstock et al. | June 20, 1939 |
| 2,302,981 | Stern | Nov. 24, 1942 |
| 2,843,474 | Ziegler et al. | July 15, 1958 |
| 2,867,546 | MacNevin | Jan. 6, 1959 |
| 2,930,686 | Wolf | Mar. 29, 1960 |